United States Patent
Ginjpalli et al.

(10) Patent No.: US 7,336,665 B1
(45) Date of Patent: Feb. 26, 2008

(54) POLLING SCHEME FOR CONTROLLING TRAFFIC THROUGH A NETWORKING SYSTEM

(75) Inventors: Hariprasada Rao Ginjpalli, Cupertino, CA (US); Quang Phung, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1005 days.

(21) Appl. No.: 10/366,202

(22) Filed: Feb. 12, 2003

(51) Int. Cl.
*H04L 12/56* (2006.01)

(52) U.S. Cl. .............................. 370/395.41; 370/230.1; 370/412; 709/234

(58) Field of Classification Search ............. 370/395.4, 370/395.41, 395.42, 395.43, 230, 336, 337, 370/345–348, 442–444, 229–235, 412–417, 370/230.1; 709/234–236
See application file for complete search history.

(56) References Cited

U.S. PATENT DOCUMENTS 6,810,426 B2 * 10/2004 Mysore et al. .............. 709/234
7,116,680 B1 * 10/2006 Kramer et al. .............. 370/465
2002/0141425 A1 * 10/2002 Merani et al. .............. 370/412
2003/0081549 A1 * 5/2003 Goetzinger et al. ...... 370/230.1

\* cited by examiner

*Primary Examiner*—Doris H. To
*Assistant Examiner*—Habte Mered
(74) *Attorney, Agent, or Firm*—Blakely, Sokoloff, Taylor & Zafman LLP

(57) ABSTRACT

A method is described that associates a first plurality of logical ports with a first bandwidth group and that associates a second plurality of ports with a second bandwidth group. The first bandwidth group is defined by a first bandwidth range whose lowest data rate is greater than a highest data rate of a second bandwidth range that defines the second bandwidth group. The method also involves servicing the first and second bandwidth groups so that: 1) each of the logical ports that are associated with the first bandwidth group are polled at a rate of X servicing trips of the first and second bandwidth groups; and, 2) each of the logical ports that are associated with the second bandwidth group are polled at a rate of Y servicing trips of the first and second bandwidth groups and where X is less than Y.

24 Claims, 6 Drawing Sheets

POLLING SCHEME FOR CONTROLLING TRAFFIC THROUGH A NETWORKING SYSTEM

FIELD OF INVENTION

The field of invention relates to networking generally; and, more specifically, to a polling scheme for controlling traffic flow through a networking system.

BACKGROUND

FIG. 1 shows a depiction of a networking system 101 having a switching fabric 102 that switches units of traffic (e.g., packets, cells, frames, TDM time slots, etc.) or portions thereof that have been received by a plurality of ingress ports $104_{21}$ through $104_{2N}$. Once a unit of traffic (or portion thereof) has been switched through the switching fabric, it is directed to at least one egress port (e.g., at least one of egress ports $104_{11}$ through $104_{1N}$). Often, each ingress port and egress port (either of which may be referred to as a logical port) corresponds to an amount of bandwidth that is allocated on a networking line.

As such, amongst the more common implementations, a logical port may be regarded as the bandwidth resources committed to a single connection carried over a networking line, the bandwidth resources committed to a group of connections that are carried over a networking line, or the bandwidth resources of an entire networking line. Some implementations may even allow a logical port correspond to the bandwidth resources committed to more than one network line. A networking line is a typically implemented with a copper or optical communication link. For simplicity, FIG. 1 has drawn each logical port as having one associated networking line (e.g., ingress logical ports $104_{21}$ through $104_{2N}$ are associated with ingress networking lines $105_{21}$ through $105_{2N}$; and, egress logical ports $104_{11}$ through $104_{1N}$ are associated with egress networking lines $105_{11}$ through $105_{1N}$).

The path that each traffic unit follows (i.e., from its ingress port to its egress port) may be referred to as the flow of the traffic unit. Each flow within the networking system 101 may have one or more associated speeds depending upon how the networking system 101 is integrated into a larger network. For example, if a particular traffic unit arrives at the ingress side along a "low speed" connection and departs from the egress side along a "high speed" connection, the traffic unit's constituent data portions will arrive at networking system 101 at a slower rate than it is transmitted from networking system 101.

Because the networking system 101 can handle networking connections of differing speeds as described above, the networking system 101 may be asked to simultaneously handle a wide range of different flows. As a consequence, an architectural layer referred to as the ingress/egress unit 103 is responsible for: 1) collecting ingress traffic from the ingress logical ports $104_{21}$ through $104_{2N}$ and forwarding the ingress traffic to the switch fabric 102; and, 2) collecting egress traffic from the switch fabric 102 and then distributing it as appropriate to the various egress logical ports $104_{11}$ through $104_{1N}$.

Because each logical port has its own associated bandwidth or "speed", the manner in which the ingress ports $104_{21}$ through $104_{2N}$ forward their traffic units (or portions thereof) to the ingress/egress unit 103—and the manner in which the egress ports $104_{11}$ through $104_{1N}$ receive traffic units (or portions thereof) from the ingress/egress unit 103—can become complicated. Specifically, noting that each logical port has its own associated queue: 1) a "fast" ingress logical port queue might regularly "overflow" (causing loss of traffic) if the ingress/egress unit 103 does not receive traffic units (or portions thereof) from the "fast" ingress logical port at a fast enough rate; 2) a "fast" egress logical port queue might regularly "empty out" (so as to starve its associated egress networking line) if the ingress/egress unit 103 does not transmit traffic units (or portions thereof) at a fast enough rate to the "fast" egress logical port; 3) a "slow" ingress logical port queue might regularly "empty out" (which corresponds to operational inefficiency) if the ingress/egress unit 103 receives traffic units (or portions thereof) at too fast a rate from the "slow" ingress logical port; and, 4) a "slow" egress logical port queue might regularly "overflow" (so as to cause loss of traffic) if the ingress/egress unit 103 forwards traffic units (or portions thereof) at too fast a rate to the "slow" egress logical port.

Thus, to implement the networking system's associated traffic flows in both a proper and efficient manner, the ingress/egress unit 103 should tailor the rate of traffic flow with each logical port according its speed. With the increased complexity of today's networks, not only is the number of logical ports per networking system increasing; but also, the variation in bandwidth amongst logical ports maintained by a networking system is also increasing (e.g., from very high speed logical ports to very low speed logical ports and a wide range of intermediate speed logical ports). Both of these trends push the sophistication and difficulty of the design of the ingress/egress traffic unit 103.

The networking system 101 of FIG. 1 therefore uses a polling scheme. In a polling scheme, each logical port has some form of intelligence that is "aware" of the state of its corresponding queue (i.e., how full or empty its queue is) and is capable of communicating the state of its queue, in some manner, with the ingress/egress unit 103. For example, in the egress direction, polling unit 103, is responsible for "polling" each egress port at a rate that is consistent with its speed, and for each poll, effectively asking the polled logical port if it has sufficient queue space to receive a next traffic unit (or portion thereof). If so, the polling unit authorizes the transfer of a traffic unit (or portion thereof) to the polled egress port.

In the ingress direction, polling unit $103_2$ is responsible for "polling" each ingress port at a rate that is consistent with its speed, and for each poll, effectively asking the polled logical port if it has a next traffic unit (or portion thereof) to forward toward the switching fabric 102. If so, the polling unit authorizes the transfer of a traffic unit (or portion thereof) from the polled ingress port. In alternate embodiments, the polling intelligence may be integrated into the logical ports themselves (e.g., each egress logical port is configured to ask the ingress/egress unit 103 to transmit a traffic unit at a polling rate that is consistent with its speed; each ingress logical port is configured to ask the ingress/egress unit 103 to receive a traffic unit at a polling rate that is consistent with its speed).

The communication lines $107_1$, $107_2$ used for the polling activity may be implemented as separate serial channels (as suggested by FIG. 1) or with a shared medium (such as a bus). Likewise, the data path lines $108_1$, $108_2$ used for the transportation of traffic units (or portions thereof) may be implemented as separate serial channels (as suggested by FIG. 1) or with a shared medium (such as a bus). Queues $106_1$, $106_2$ may be used to queue traffic between the logical ports and the switch fabric in both directions. Note that more than one logical port may be implemented onto a single line interface card (LIC)) that is "plugged into" the networking system's backplane

FIGURES

The present invention is illustrated by way of example and not limitation in the figures of the accompanying drawings, in which like references indicate similar elements, and in which.

DETAILED DESCRIPTION

Figure 2:
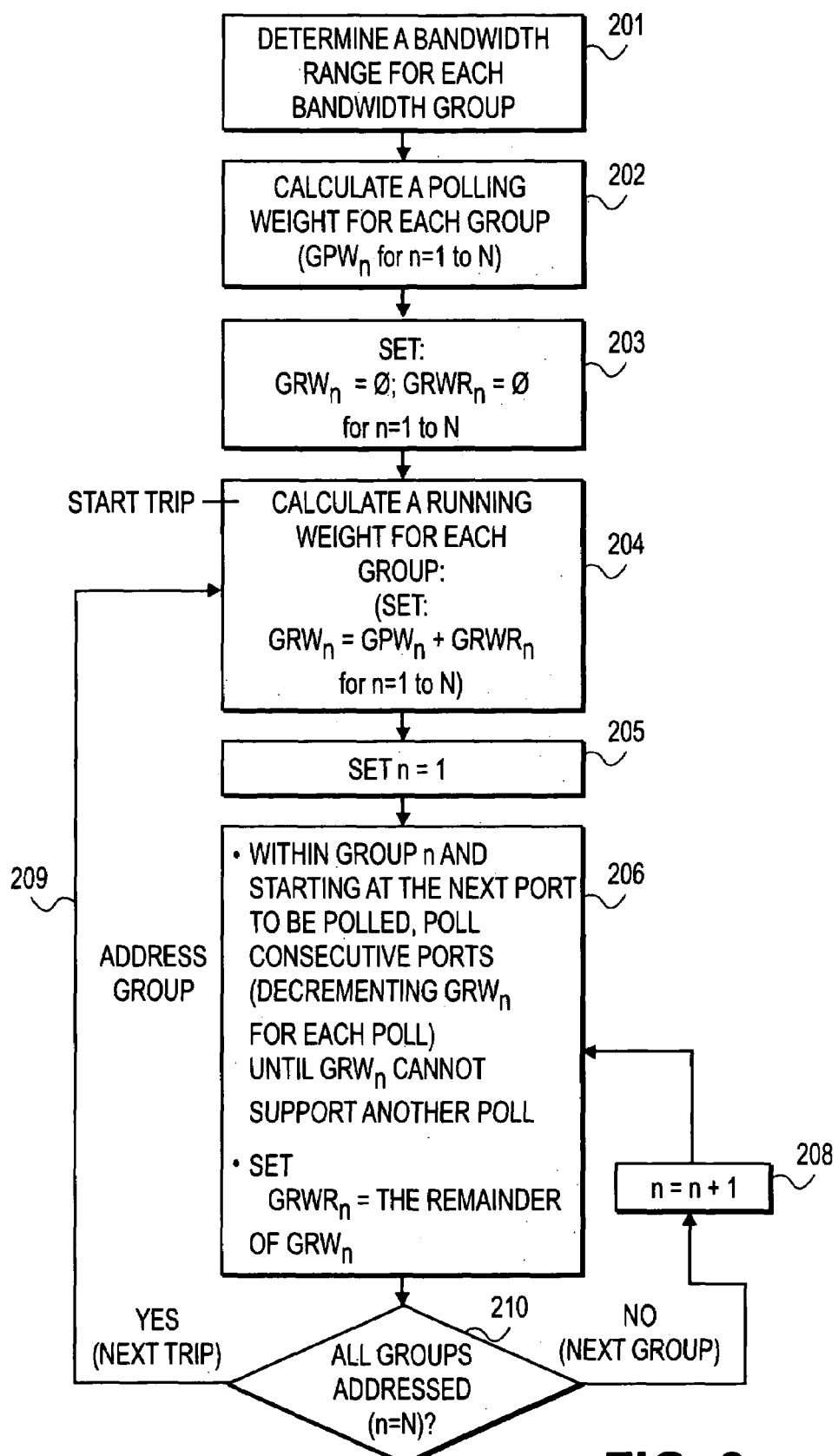
FIG. 2 shows a polling methodology.

FIG. 2 demonstrates a methodology that can be used to successfully manage the polling of a large number of logical ports where the bandwidth allocation amongst the various logical ports is widely varied (e.g., as embodied in a networking system having a collection of low speed logical ports, medium speed logical ports and high speed logical ports). According to the methodology of FIG. 2, the spectrum of bandwidth allocations made to the various logical ports to be polled are considered; and, typically, more than one "bandwidth group" is formed. For example, in a basic case, three bandwidth groups are formed: "high speed", "medium speed"; and, "low speed".

Figure 3:
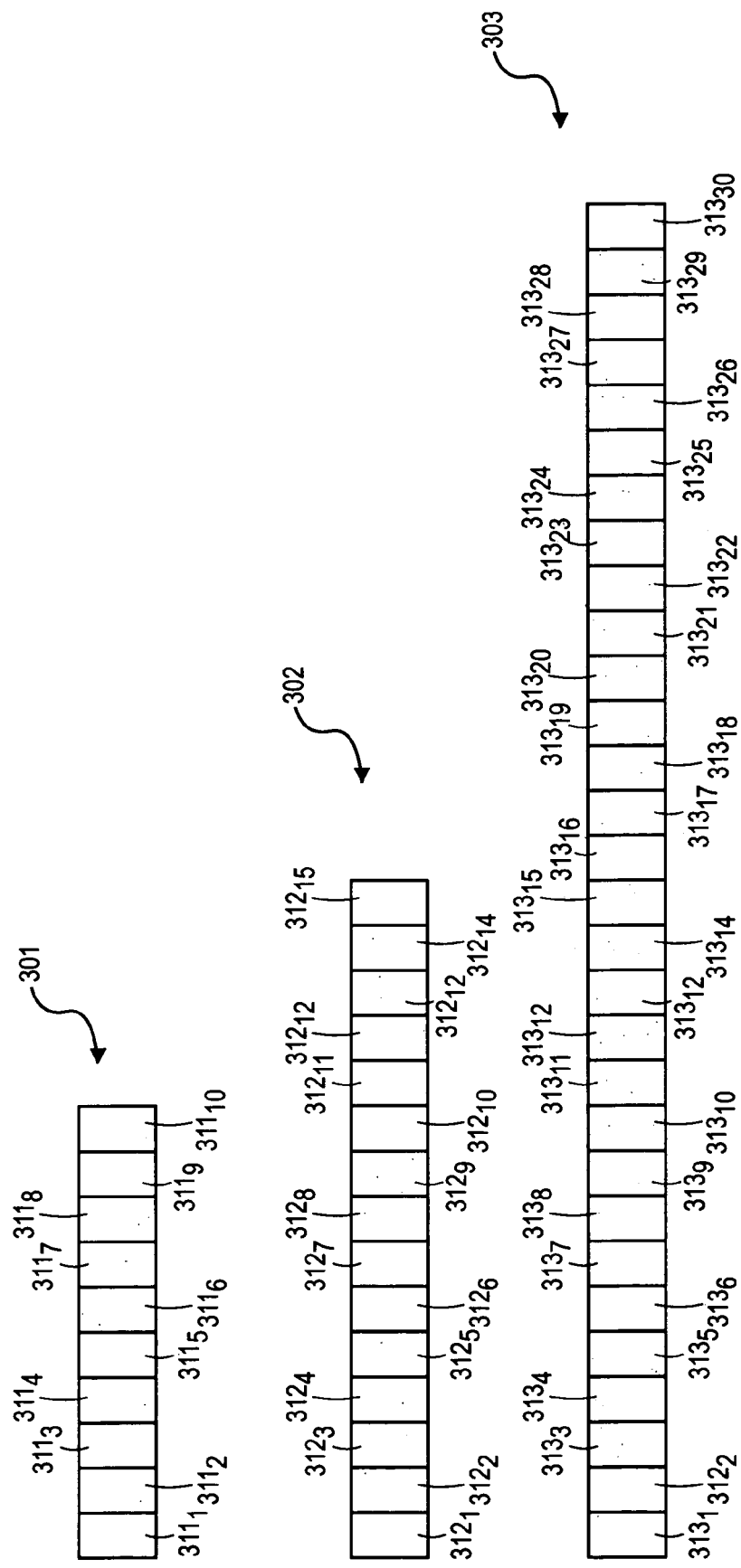
FIG. 3 shows a schematic depiction of logical ports to be polled who have been grouped according to their corresponding speeds.

Each logical port to be polled is identified with its corresponding bandwidth group. That is, continuing with the example referred to just above, all the high speed logical ports are identified as belonging to the "high speed" bandwidth group; all the medium speed logical ports are identified as belonging to the "medium speed" bandwidth group; and, all the low speed logical ports are identified as belonging to the "low speed" bandwidth group. FIG. 3 shows a depiction that can be used to support this example (as well as the remainder of the methodology of FIG. 2) by showing an exemplary depiction of all of the active ports within a networking system being grouped according to three distinct bandwidth groups 301, 302, 303.

For the sake of example consider group 301 to be the "high speed" group; group 302 to be the "medium speed" group; and, group 303 to be the "low speed" group. According to the exemplary depiction of FIG. 3, ten high speed logical ports $311_1$ through $311_{10}$ are identified as belonging to the high speed bandwidth group 301; fifteen medium speed logical ports $312_1$ through $312_{15}$ are identified as belonging to the medium speed bandwidth group 302; and, thirty low speed logical ports $313_1$ through $313_{30}$ are identified as belonging to the low speed bandwidth group 303. In an embodiment, groups are kept track of in a particular direction (e.g., FIG. 3 represents all the ingress logical ports or all the egress logical ports within a networking system).

Here, as just one instance of a networking system having the logical port bandwidth allocation profile that is described by FIG. 3, the ten high speed logical ports $311_1$ through $311_{10}$ may each be a logical port whose bandwidth allocation falls within a range of "high speed" bandwidth allocations (e.g., each "high speed" logical port has a bandwidth allocation that falls within a range of 90 Megabits per second (Mbps) to 110 Mbps; the fifteen medium speed logical ports $312_1$ through $312_{15}$ may each be a logical port whose bandwidth allocation falls within a range of "medium speed" bandwidth allocations (e.g., each "medium speed" logical port has a bandwidth allocation that falls within a range of 40 Mbps to 60 Mbps); and the thirty low speed logical ports $313_1$ through $313_{30}$ may each be a logical port whose bandwidth allocation falls within a range of "low speed" bandwidth allocations (e.g., each "low speed" logical port has a bandwidth allocation that falls within a range of 20 Mbps to 30 Mbps).

Note that not only may logical ports of different bandwidth co-exist within the same bandwidth group (as provided just above); but also, depending on the construction of a bandwidth group, each logical port within a common bandwidth group may have the same bandwidth allocation. Moreover note that although large continuity gaps may exist with respect to the definition of neighboring bandwidth groups (e.g., there is a continuity "gap" of 30 Mbps from the high end of the medium speed bandwidth group (60 Mbps) to the low end of the high speed bandwidth group (90 Mbps)), in various embodiments, reduced or nonexistent continuity gaps may exist with respect to neighboring bandwidth groups.

The methodology of FIG. 2 initially refers to the determination of a bandwidth range for each bandwidth group 201. The bandwidth range of a bandwidth group is (and may be specified by defining) the bandwidth allocation of the "fastest" and "slowest" logical ports that can be assigned to it. For example, the bandwidth range of a bandwidth group that is to entertain all logical ports having a bandwidth allocation greater than or equal to 90 Mbps but less than or equal to 110 Mbps corresponds to a bandwidth range of 90 Mbps to 110 Mbps. A particular bandwidth group may be referred to by its range (e.g., "the 90 Mbps to 110 Mbps" bandwidth range). The magnitude of a bandwidth group is the range of bandwidth that the group covers.

Note that a bandwidth group constructed of logical ports having identical bandwidth allocation (e.g., a "low speed" bandwidth group constructed only from 1 Mbps logical ports) may be said to possess a "unit" magnitude. It is a characteristic of the polling technique(s) discussed herein that, generally, a number of different bandwidth groups may be configured for a particular networking system; and, furthermore, the magnitude or size of each bandwidth group within the particular networking system may be configured independently. As such, if a networking system is to be configured to have N bandwidth groups, each of the N networking groups may be configured to have unique magnitudes, identical magnitudes, some unique magnitudes and some identical magnitudes, etc.

Once the bandwidth range for each bandwidth group has been determined 201, a "polling weight" is calculated 202 for each bandwidth group. The polling weight is a number that accounts for the rate of the logical ports within its associated bandwidth group so that the overall networking system operates properly and efficiently. A better understanding of a polling weight will be made more clear in the discussion that follows. As will be described in more detail immediately below, the polling technique of FIG. 2 services each bandwidth group in a round robin fashion. That is, for example, referring to FIG. 3: first, group 301 is serviced; then, group 302 is serviced; then, group 303 is serviced. The process then repeats consistent with a round robin servicing of the various bandwidth groups. Each "loop" through the round robin sequence may be referred to as "trip" through the bandwidth groups (i.e., one trip corresponds to the servicing of each bandwidth group).

Figure 1:
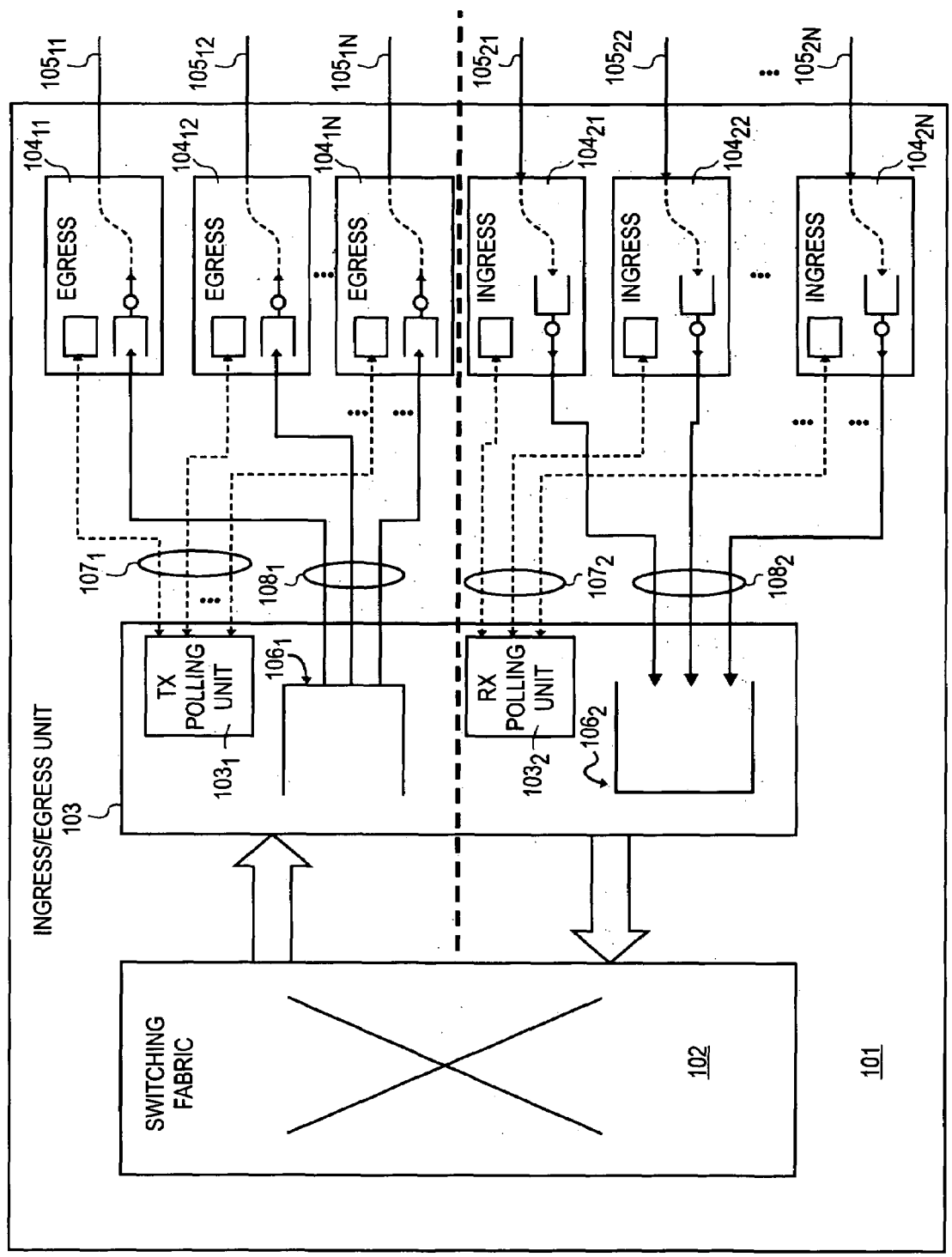
FIG. 1 shows a networking system.

The servicing of a bandwidth group means that one or more of the logical ports within the bandwidth group being serviced are polled. In a networking system having the architecture observed in FIG. 1, the polling of a ingress logical port means that the ingress logical port is allowed to send one or more traffic units (or portions thereof) toward the switch fabric 102; and, the polling of a egress logical port means that the egress logical port is allowed to receive one or more traffic units (or portions thereof) that have been sent by the switch fabric 102. In a further embodiment, for each poll, a fixed size amount of data is transferred between the polled logical port and the ingress/egress unit 103 (e.g., 64 bytes worth of data per poll from/to the polled logical port to/from the switching fabric).

A bandwidth group's "polling weight" corresponds to the number of logical ports that may be serviced from the bandwidth group per trip. A method for calculating a bandwidth group's polling weight is described in more detail further below that ensures that a bandwidth group's polling weight will not exceed the group's number of logical ports. Better said, a bandwidth group's polling weight corresponds to the number of logical ports within the bandwidth group that may be serviced per trip through the bandwidth groups according to the round robin sequence. The polling weight is a specially calculated number that, when correctly calculated, allows the logical ports within a bandwidth group to be automatically serviced at a rate that is consistent with their bandwidth allocation. As such, logical ports that are associated with a higher speed bandwidth group are serviced more frequently than logical ports that are associated with a lower speed logical group.

A technique for calculating a polling weight for a particular bandwidth group is presented in more detail further below with respect to FIG. 4. As such, FIGS. 2 and 3 will be used to demonstrate an overall polling example with "assumed" polling weights for each of the bandwidth groups 301, 302, 303 observed in FIG. 3. The discussion of FIG. 4 will reveal how these assumed polling weights may be specifically calculated. Accordingly then, assume that: 1) the polling weight of the high speed bandwidth group 301 is 10.0; 2) the polling weight of the medium speed bandwidth group 302 is 7.5; and, 3) the polling weight of the low speed bandwidth group 303 is 7.5. Note that, as the total number of bandwidth groups is three in this instance (i.e., N=3), the term "n" may be referred to each bandwidth group individually. As such, if the term $GPW_n$ is used to generically refer to the polling weight of any group bandwidth; then, in accordance with the example being described herein: $GPW_1=10.0$, $GPW_2=7.5$; and, $GPW_3=7.5$.

Once the ranges of the bandwidth groups 301, 302, 303 have been specified 201 and the polling weights have been calculated 202 for each bandwidth group 301, 302, 303; the round robin servicing of the bandwidth groups may commence. An example of a round robin sequence for servicing the bandwidth groups is demonstrated by sequences 203 through 208 of FIG. 2. Sequence 203 corresponds to an initialization process that clears a "group run weight" $GRW_n$ parameter and a "group run weight remainder" $GRWR_n$ parameter (i.e., for n=1 to N: $GRW_n=0$ and $GRWR_n=0$). As will be observed in the example that follows, a separate group run weight parameter and group run weight remainder is kept track of for each bandwidth group to determine the actual number of logical ports that may be serviced within the bandwidth group for any particular trip through the bandwidth groups.

The group run weight parameter for each bandwidth group is updated 204 for each trip through the round robin servicing scheme (e.g., each "loop" through that process flow 209 of FIG. 2 represents). In the methodology of FIG. 2, every "per loop" update 204 involves incrementing the group run weight parameter for each bandwidth group by its corresponding group polling weight and group run weight remainder. Recalling that before the initial trip is executed both the group run weight and the group run weight remainder are cleared 203 for each bandwidth group, the initial update 204 (i.e., at the start of the first trip through the bandwidth groups) causes the group run weight for each bandwidth group to be set equal to its group polling weight (i.e., before the first trip is started: $GRW_n=GPW_n$). With respect to the specific example being described, the initial update 204 results in $GRW_1=10.0$; $GRW_2=7.5$; and, $GRW_3=7.5$.

Once the group run weight has been initially updated 204 for each bandwidth group, each bandwidth group is serviced in succession according to a round robin sequence (note, however, that with respect to the round robin sequence, no particular ascending or descending order with respect to the speed of the bandwidth groups is required). Sequences 205, 206, 207 and 208 implement the successive servicing of each bandwidth group. According to the approach of FIG. 2, n is initially set 205 equal to 1 in order to cause the first group (e.g., high speed group 301) to be serviced first. The servicing 206 of a bandwidth group involves starting at a "next" port to be polled and polling consecutive logical ports within the bandwidth group. For each logical port that is polled during the servicing 206, the group run weight for the bandwidth group is decremented by 1; and, the polling of consecutive logical ports is continued until the group run weight is decremented to a value less than 1. Here, the "next" port to be polled may be considered to be the logical port following the last logical port within the bandwidth group to be polled.

As such, the last logical port that was polled (or the next logical port to be polled) should be kept track of for each bandwidth group. Thus, in order to service each of the logical ports within a particular bandwidth group in a round robin sequence, the "next" logical port to be serviced relative to the "last" logical port within the bandwidth group is the "first" logical port within the bandwidth group. That is, referring to FIG. 3: 1) the "next" logical port relative to logical port $311_{10}$ within bandwidth group 301 is logical port $311_1$; 2) the "next" logical port relative to logical port $312_{15}$ within bandwidth group 302 is logical port $312_1$; and, 3) the "next" logical port relative to logical port $313_{30}$ within bandwidth group 303 is logical port $313_1$.

Note that, as an initial default value (e.g., as part of sequence 203), the parameters that keep track of the last logical port that was polled for each bandwidth group may be set to the last logical port within each bandwidth group; or, alternatively, the parameters that keep track of the next logical port to be polled for each bandwidth group may be set to the first logical port within each bandwidth group. Either of these approaches ensure that the servicing of each bandwidth group starts at the first logical port within each bandwidth group during the first loop. It is important to recognize that the ordering of the logical ports within a particular bandwidth group (e.g., the mechanism by which a particular logical port is considered to be the "first" logical port, etc.) may be arbitrary, structured (e.g., by networking line, backplane card slot, etc.) or some combination thereof.

In the case of the first servicing of the high speed bandwidth group 301, given that the first logical port 311$_1$ is first to be polled and given that the initial value of GRW$_1$=10.0, note that the servicing of the first bandwidth group 310 will stop after the last logical port 311$_{10}$ has been polled. That is, as a consequence of polling the logical ports in succession and decrementing GRW$_1$ for each poll, by the time the time it is the last logical port's 311$_{10}$ turn to be polled, the GRW$_1$ value will have decremented from a value of 10.0 to a value of 1.0. Upon the last logical port's polling, the GRW$_1$ value will decrement to a value of 0.0.

Another aspect of servicing 206 a bandwidth group is the updating the bandwidth group's group run weight remainder value (i.e., GRWR$_1$ for bandwidth group 301). The group run weight remainder value for a bandwidth group is the amount of the group run weight parameter that is "left over" once the group run weight parameter has decremented to a value that cannot support another poll. For example, considering the aforementioned design where the group run weight parameter is decremented by 1.0 for each poll (and wherein polling must cease once the group run weight is decremented to a value beneath 1.0, in each instance), the group run weight remainder parameter will be whatever value beneath 1.0 the group run weight parameter is left with after the final decrement is made in light of a final poll within a particular servicing sequence 206.

As such, continuing with the example being discussed thus far, upon the last logical port's polling for the high speed bandwidth group 301, the GRWR$_1$ value will be set to a value of 0.0 (because, as mentioned above, upon the last logical port's polling, the GRW$_1$ value will decrement to a value of 0.0). Lastly, for high speed group 301, the last logical port that was serviced (i.e., logical port 311$_{10}$) may be recorded for the benefit of the next trip through the bandwidth groups.

Once a bandwidth group has been serviced, the next bandwidth group is serviced unless each bandwidth group has been serviced within the present loop. The methodology of FIG. 2 controls this function through sequences 207 and 208. Here, once the high speed group 301 is serviced 206, n is still equal to 1. As a consequence the answer to inquiry 207 is "no" and n is incremented 208 to a value of 2; which, in turn, corresponds to the servicing 206 of the medium speed bandwidth group 302.

According to the same principles discussed at length above, the combination of starting the polling at logical port 312$_1$ and having an initial group run weight value of GRW$_2$=7.5, results in logical ports 312$_1$ through 312$_7$ being polled during the first servicing of the medium speed bandwidth group 302; and, the group run weight remainder parameter for the medium speed bandwidth group 302, GRWR$_2$, being set equal to 0.5. The low speed group 303 will then be serviced 206 next (which corresponds to n=3). The servicing of the speed bandwidth group 303 results in logical ports 313$_1$ through 313$_7$ being polled; and, the group run weight remainder parameter GRWR$_3$ being set equal to 0.5. After the servicing of the low speed group 303, the answer to inquiry 207 is "yes" and the first trip through the bandwidth groups is completed.

The run weight parameter for each of the groups is then updated 204. According to the relationship GRW$_n$=GPW$_n$+GRWR$_n$ for n=1 to N, each group run weight is increased by the corresponding group polling weight and group run weight remainder values. In the case of the example being discussed, this produces: 1) a GRW$_1$ value of 10.0 (i.e., 10.0+0.0=10.0); 2) a GRW$_2$ value of 8.0 (i.e., 7.5+0.5=8.0); and, 3) a GRW$_3$ value of 8.0 (i.e., 7.5+0.5=8.0). As such, the second servicing 206 of the high speed group is identical to the first servicing (i.e., logical ports 311$_1$ through 311$_{10}$ are polled; and, the group polling weight remainder value is set to 0.0). The second servicing of the medium speed group 302, however, starts at the next logic port to be polled (logic port 312$_8$) and polls logic ports 312$_8$ through 312$_{15}$.

Note that, because a 0.5 group run weight remainder value existed after the first servicing of the medium speed bandwidth group 302, the group run weight for the second servicing 206 of the medium speed bandwidth group (i.e., GRW$_2$) is 8.0 (rather than 7.5 as was the case for the first servicing of the medium speed bandwidth group 302). This causes the second servicing sequence 206 of the medium speed bandwidth group 302 to: 1) poll eight logical ports (i.e., logical ports 312$_8$ through 312$_{15}$) rather than seven logical ports (as occurred during the first servicing of the medium speed bandwidth group); and, 2) leave a group run weight remainder value of 0.0 (because 8.0 is an integer and the group run weight parameter is decremented by 1 for each poll). Here, maintaining a group run weight remainder value allows the proper bandwidth of the logical ports to be realized over time. That is, because each non integer remainder corresponds to some amount of bandwidth that the bandwidth group as a whole is owed, adding the remainder values together so as to enjoy an "additional" poll on non consecutive trips allows a bandwidth group to receive, over time, the proper number of polls.

Note also that, because a 0.5 group run weight remainder value existed after the first servicing of the low speed bandwidth group 303, the group run weight for the second servicing 206 of the low speed bandwidth group (i.e., GRW$_3$) is 8.0 (rather than 7.5 as was the case for the first servicing of the low speed bandwidth group 303). This causes the second servicing sequence 206 of the low speed bandwidth group 303 to: 1) poll eight logical ports (i.e., logical ports 313$_8$ through 313$_{15}$) rather than seven logical ports (as occurred during the first servicing of the low speed bandwidth group); and, 2) leave a group run weight remainder value of 0.0 (because 8.0 is an integer and the group run weight parameter is decremented by 1 for each poll).

From the analysis of the second trip of the specific example being described herein it is clear that: 1) every logical port within the high speed bandwidth group 301 is polled once every trip (i.e., every logical port within the high speed bandwidth group 301 may be said to be polled at a rate of one poll per "X" servicing trips of groups 301, 302, 303; where, X=1); 2) every logical port within the medium speed bandwidth group 302 is polled once every two trips (i.e., every logical port within the medium speed bandwidth group 302 may be said to be polled at a rate of one poll per "Y" servicing trips of groups 301, 302, 303; where, Y=2); and, 3) every logical port within the low speed bandwidth group is polled once every four trips (i.e., every logical port within the low speed bandwidth group 303 may be said to be polled at a rate of one poll per "Z" servicing trips of groups 301, 302, 303; where, Z=4).

Note that this feature is consistent with the understanding that the logical ports within the high speed bandwidth group 301 are to receive greater bandwidth allocation than the logical ports within the medium speed bandwidth group 302; and, likewise, the logical ports within the medium speed bandwidth group 302 are to receive greater bandwidth allocation than the logical ports within the low speed bandwidth group 303. Here, as each poll can correspond to transferring a fixed amount of data between the polled logical port and a switching fabric, it is clear that polling a logical port more frequently corresponds to allocating more bandwidth to that logical port.

Recall that the example that was used as a basis for describing the methodology of FIG. 2 involves "assumed" polling weight numbers of 10.0, 7.5 and 7.5 for the high speed, medium speed and low speed bandwidth groups 301, 302, 303 respectively. FIG. 4 shows a methodology that may be used to calculate the group polling weight for a particular bandwidth group. Here, an example that produces group polling weights of 10.0, 7.5 and 7.5 for bandwidth groups 301, 302 and 303 will be provided. In particular, assume that: 1) the ten logical ports $311_1$ through $311_{10}$ that make up the high speed bandwidth group 301 correspond to six 100 Mbps logical ports, two 90 Mbps logical ports and two 110 Mbps logical ports; 2) the fifteen logical ports $312_1$ through $312_{15}$ that make up the medium speed bandwidth group 302 correspond to thirteen separate 50 Mbps logical ports, one 40 Mbps logical port and one 60 Mbps logical port; and, 3) the thirty logical ports $313_1$ through $313_{30}$ that make up the low speed bandwidth group 303 correspond to twenty six 25 Mbps logical ports, two 20 Mbps logical ports and two 30 Mbps logical ports.

Figure 4:
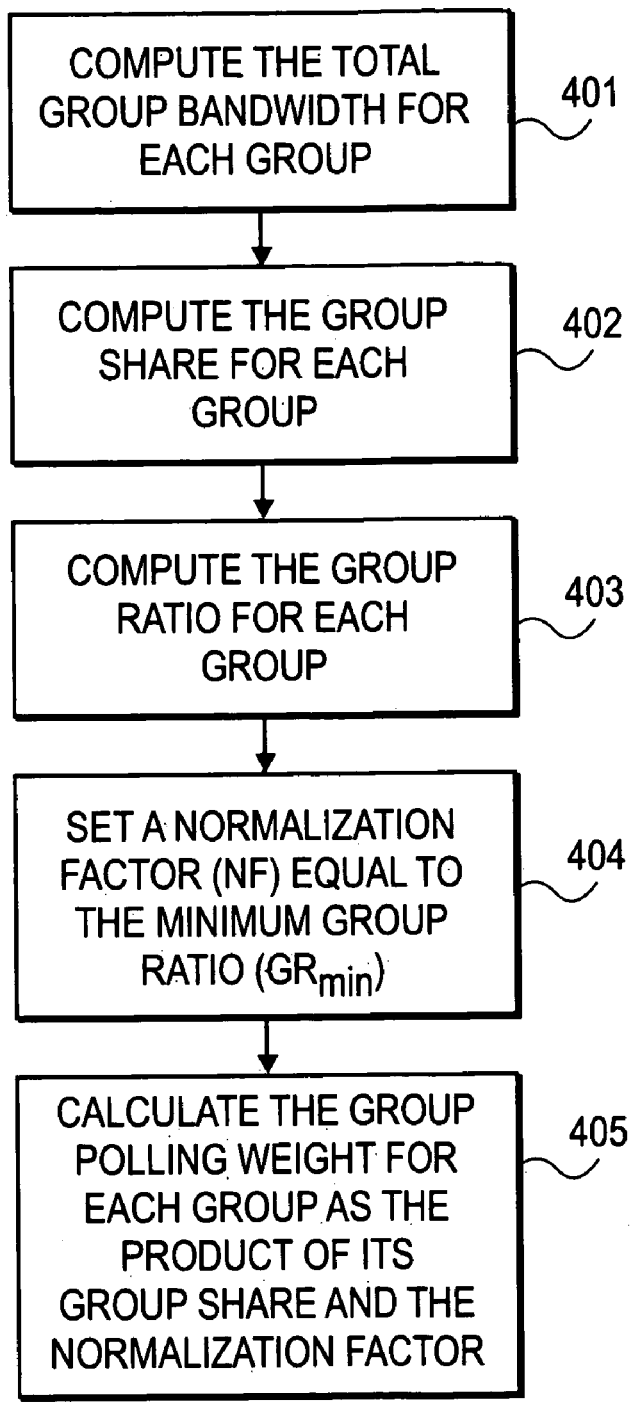
FIG. 4 shows a methodology for determining a polling weight for each speed group of logical ports within a networking system.

According to the methodology of FIG. 4, the total group bandwidth for each bandwidth group is calculated 401. The total group bandwidth for a bandwidth group is determined by summing together the bandwidth allocation for each logical port within the bandwidth group. More generically, the total group bandwidth TGBW for the $n^{th}$ bandwidth group may be expressed as:

$$TGBWn = \sum_{p=1}^{p=Pn} Rp \quad \text{EQN. 1}$$

where: 1) p is a variable used to represent each port within the $n^{th}$ bandwidth group; 2) Rp is the rate of each logical port p within the $n^{th}$ bandwidth group; and, 3) Pn is the total number of logical ports within the $n^{th}$ bandwidth group.

Using the exemplary description provided just above, the total group bandwidth for the high speed bandwidth group 301 is 1 Gbps (because (6×100 Mbps)+(2×90 Mbps)+(2×110 Mbps)=1 Gbps); the total group bandwidth for the medium speed bandwidth group 302 is 750 Mbps (because (13×50 Mbps)+(1×40 Mbps)+(1×60 Mbps)=750 Mbps); and, the total group bandwidth for the low speed bandwidth group 303 is 750 Mbps (because (26×25 Mbps)+(2×20 Mbps)+(2×30 Mbps)=750 Mbps).

Once the total group bandwidth for each bandwidth is calculated 401, the group share is calculated 402 for each bandwidth group. The group share of a particular bandwidth group is that particular bandwidth group's bandwidth allocation expressed a percentage of the total amount of allocated bandwidth within the networking system. More generically, the group share GS for the $n^{th}$ bandwidth group can be expressed as:

$$GSn = \frac{(TGBWn)}{\sum_{n=1}^{n=N} TGBWn} \quad \text{EQN. 2}$$

where TGBWn is as defined above in EQN. 1 and N is the total number of bandwidth groups.

As such, the group share for a particular bandwidth group may be calculated as that particular bandwidth group's total group bandwidth divided by the summation of every bandwidth group's total group bandwidth. Thus, continuing with the example being presently described, note that the summation of every bandwidth group's total group bandwidth is 2.5 Gbps (because 1 Gbps+750 Mbps+750 Mbps=2.5 Gbps). As such, the group share for the high speed bandwidth group is 0.4 (because 1 Gbps/2.5 Gbps=0.4); the group share for the medium speed bandwidth group is 0.3 (because 750 Mbps/2.5 Gbps=0.3); and, the group share for the low speed bandwidth group is 0.3 (because 750 Mbps/2.5 Gbps=0.3).

Once the group share has been calculated 402 for each bandwidth group, a ratio 403 is calculated for each group. The ratio for the $n^{th}$ bandwidth group is the number of logical ports associated with the particular bandwidth group divided by the particular bandwidth group's share. That is:

$$\text{Ratio}(n) = Pn/GSn \quad \text{EQN. 3}$$

where Pn is the total number of ports within the $n^{th}$ group and GSn is the group share for the nth group.

Thus, the ratio for the first bandwidth group 301 is 25 (because 10/.4=25); the ratio for the second bandwidth group 302 is 50 (because 15/0.3=50); and, the ratio for the third bandwidth group 303 is 100 (because 30/0.3=100). Once the ratio has been calculated for each bandwidth group, a normalization factor NF is established 404 that corresponds to the minimum calculated ratio.

That is:

$$NF = (\text{Ratio}(n))_{min} \text{ for all } n \text{ from } n=1 \text{ to } n=N \quad \text{EQN. 4}$$

From the above ratios, the normalization factor is 25 (because the minimum ratio above is 25). The normalization factor is then applied 405 to each bandwidth group to calculate the group polling weight. That is, the polling weight PW for the nth bandwidth group can be calculated as:

$$PWn = NF \times GSn \quad \text{EQN. 5}$$

As such, the group polling weight for the high speed bandwidth group 301 is 10.0 (because 25×0.4=10.0); the group polling weight for the medium speed bandwidth group 302 is 7.5 (because 25×0.3=7.5); and, the group polling weight for the low speed bandwidth group 303 is 7.5 (because 25×0.3=7.5). Note that these values precisely conform to the example that was discussed with respect to FIG. 2.

Moreover note that, with respect to this example, the average logical port bandwidth in the high speed bandwidth group is 100 Mbps per logical port, the average logical port bandwidth in the medium speed bandwidth group is 50 Mbps per logical port, and the average logical port bandwidth in the low speed bandwidth group is 25 Mbps per logical port. Here, note these bandwidth allocations can be achieved by: 1) polling every logical port within the high speed bandwidth group 301 once every trip; 2) polling every logical port within the medium speed bandwidth group once every two trips; and, 3) polling every logical port within the low speed bandwidth group once every four trips—as mentioned above with respect to the example of FIG. 2, if one poll per trip per logical port corresponds to a 100 Mbps bandwidth allocation.

In an embodiment, in the ingress direction, one poll per trip per logical port is configured to be a bandwidth allocation that is sufficiently high so as to ensure each logical port is serviced at least at the rate of its corresponding traffic. The appropriate rate can be determined by dividing the fastest logical port speed within each logical port (e.g., in the example being discussed so far: 110 Mbps for the highest speed bandwidth group, 60 Mbps for the medium speed bandwidth group, and 30 Mbps for the low speed bandwidth group) by its corresponding number of trips per service (e.g., 1 for the highest speed bandwidth group, 2 for the medium speed bandwidth group, and 4 for the low speed bandwidth group).

In the example being discussed so far this produces a bandwidth allocation of 120 Mbps for one poll per logical port per trip (because in the medium speed case: 60 Mbps× 2=120 Mbps; and/or, in the low speed case: 30 Mbps×4=120 Mbps). In this case, all logical ports are guaranteed a bandwidth allocation that is equal to or greater than their particular traffic rate. Note that some of the logical ports may be "over-serviced" (e.g., each of the 100 Mbps logical ports enjoy a service rate of 120 Mbps). Note that, generally, the narrower the bandwidth range of the bandwidth groups, the less unutilized bandwidth resulting from over servicing. If the same approach is applied in an egress direction (so that each egress logical port receives traffic from the switch fabric at a rate that is not less than its actual traffic rate), some form of queuing should be made available for those logical ports who can receive traffic from the switch core at a rate that is higher than its actual traffic rate.

Figure 5:
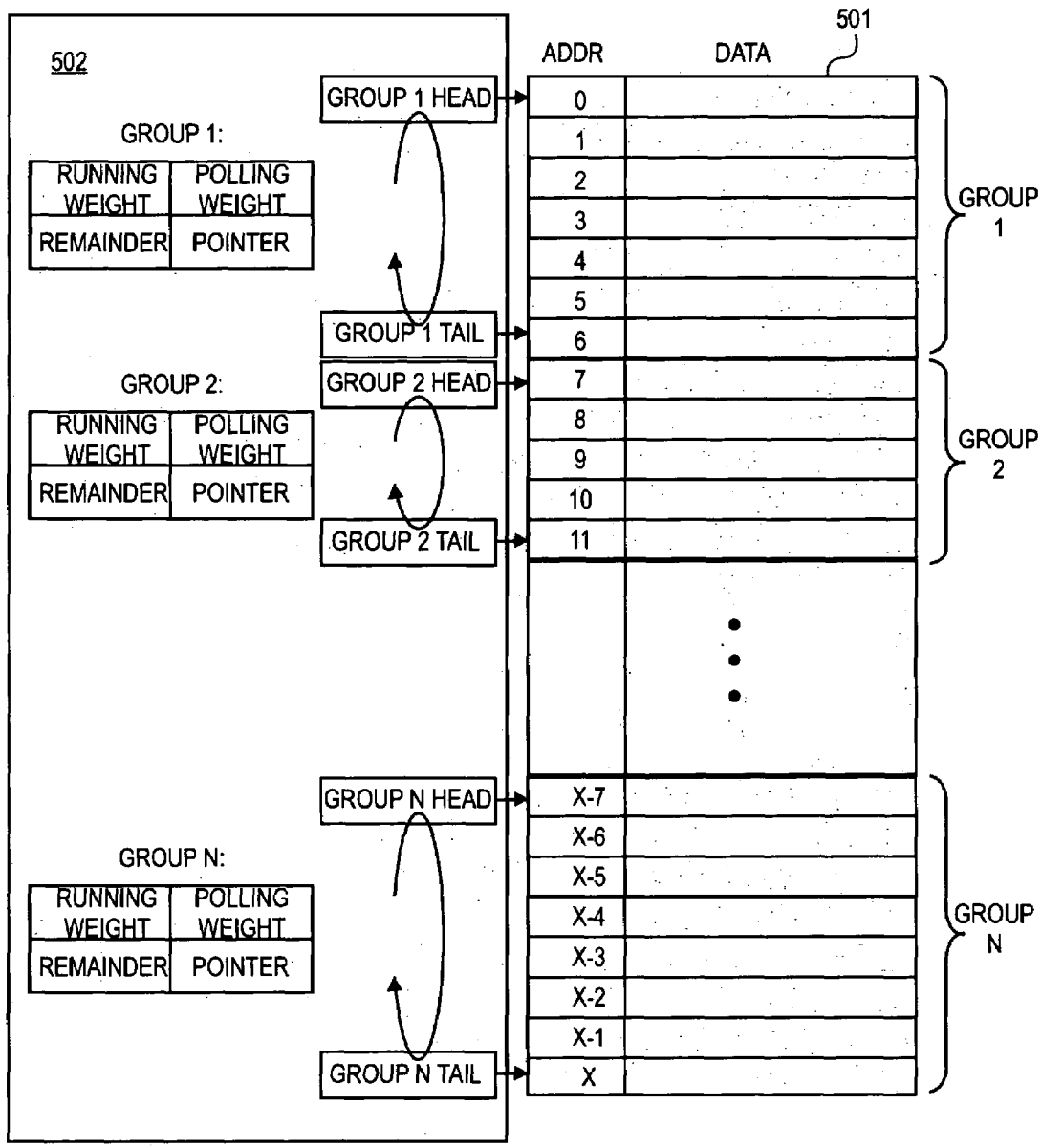
FIG. 5 represents a hardware implementation for a polling technique as described with respect to FIGS. 2 through 4.

FIG. 5 shows an embodiment of a hardware implementation that is suitable for executing a polling scheme that conforms to the approach described above with respect to FIG. 2. Notably, circuitry 502 that interfaces to a memory (such as a random access memory (RAM) 501) executes the round robin scheme while the memory 501 holds a "logical port identifier" for each logical port entertained by the networking system in a particular direction (e.g., egress or ingress). Note in the embodiment of FIG. 5 that logical port identifiers are listed at adjacent memory spaces within the address space of the memory according to the group in which they belong. A logical port identifier, when read from memory 501, effectively identifies its corresponding logical port as the port to be polled. Circuitry 502 is responsible for executing the flow of the round robin scheme so that logical port identifiers are read from memory 501 in a manner that is consistent with the polling scheme.

Note that circuitry 502 need only include six data elements (e.g., registers, other memory locations, etc.) per bandwidth group (head, tail, polling weight, running weight, remainder and pointer). The head and tail pointers define the memory range where the logical port identifiers are found for the corresponding bandwidth group. As a consequence the round robin servicing within a bandwidth group is accomplished by reading the between the addresses specified by the head and tail pointers in a round robin fashion. The polling weight is used to define the number of reads from the memory 501 per trip through the bandwidth groups. The running weight and remainder are updated with each trip and are used to define how many reads are performed from the memory 501 for any particular trip through the bandwidth groups. The pointer defines, for each trip, where a read is to start from (or where a read last took place from). Circuitry 502 may be fabricated with programmable logic (e.g., an FPGA) or hardwired (e.g., with custom logic).

Note also the polling scheme and/or the calculation of the polling weight may be performed with software. Thus, it is also to be understood that embodiments of this invention may be used as or to support a software program executed upon some form of processing core (such as the Central Processing Unit (CPU) of a computer (which may include one or more microprocessors)) or otherwise implemented or realized upon or within a machine readable medium. A machine readable medium includes any mechanism for storing or transmitting information in a form readable by a machine (e.g., a computer). For example, a machine readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

Figure 6:
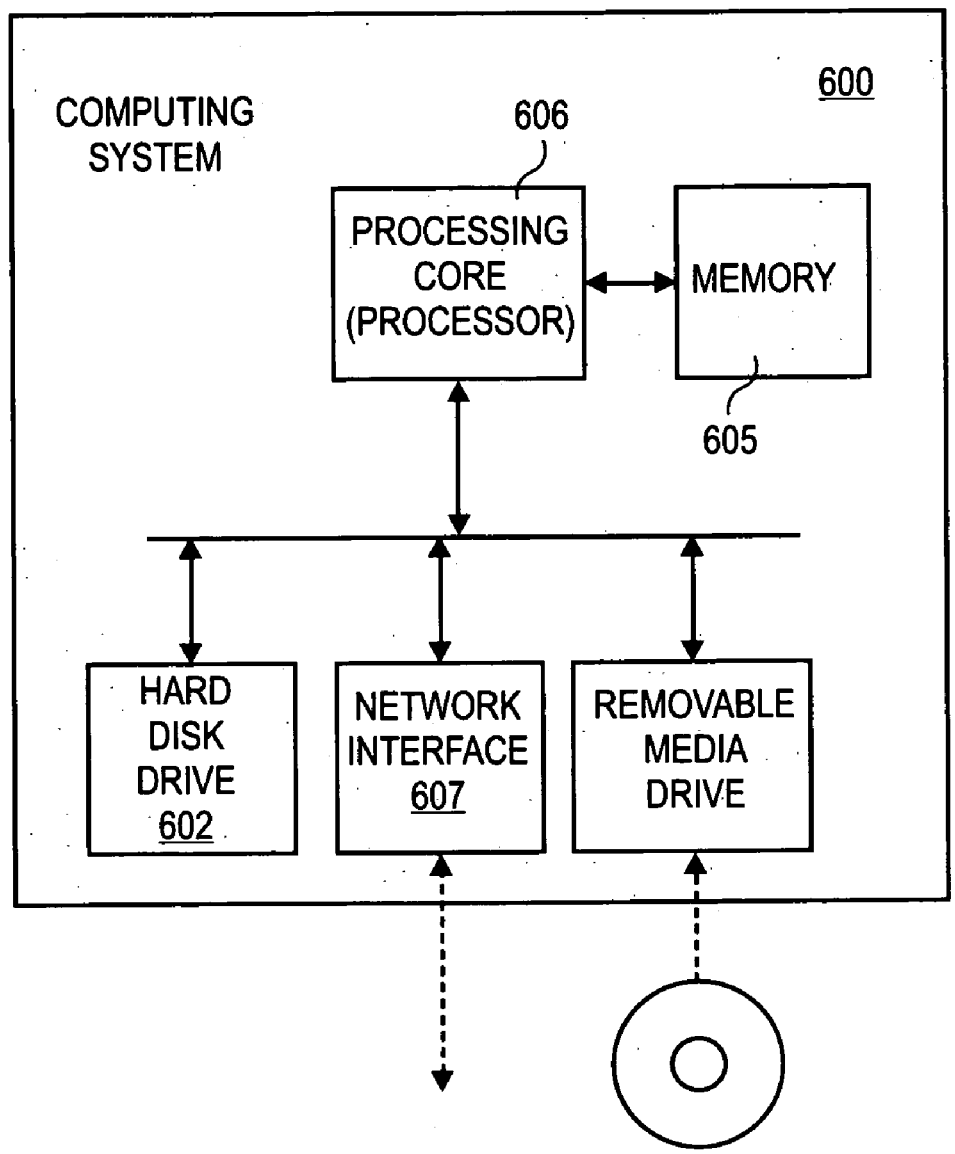
FIG. 6 shows a depiction of a computing system.

FIG. 6 is a block diagram of a computing system 600 that can execute instructions residing on a machine readable medium. The instructions may be related to calculating the polling weight for a logical port and/or executing a polling algorithm. In one embodiment, the machine readable medium may be a fixed medium such as a hard disk drive 602. In another embodiment, the machine readable medium may be movable such as a CD ROM 603, a compact disc, a magnetic tape, etc. The instructions (or portions thereof) that are stored on the machine readable medium are loaded into Random Access Memory (RAM) 605; and, the processing core 606 then executes the instructions. Note that in networking systems it is often the case where the software instructions that are loaded into memory are loaded from a semiconductor chip ROM and the "computing system" is largely viewed as just the processing core 606, the memory 605 and a communicative interface (e.g., a bus) to other functional units.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A method, comprising:
creating a plurality of bandwidth groups, each of the plurality of bandwidth groups including a plurality of logical ports to be polled;
computing a total bandwidth for each of the bandwidth groups;
computing a group share for each of the bandwidth groups;
computing a group ratio for each of the bandwidth groups;
setting a normalization factor based upon a minimum group ratio selected from amongst a plurality of group ratios calculated for each of the bandwidth groups, each of the plurality of group ratios being a count of logical ports in a bandwidth group divided by the group share for the bandwidth group;
multiplying the normalization factor by the group ratio for each of the bandwidth groups to calculate a polling weight for each of the bandwidth groups;
polling the plurality of logical ports in a plurality of trips; and,
servicing each bandwidth group in succession on each trip to authorize logical ports from the bandwidth group to transfer data, the number of logical ports authorized on each trip being one of the polling weight for the bandwidth group and the polling weight for the bandwidth group plus one.

2. The method of claim 1 further comprising maintaining a polling run weight for said bandwidth group by:
for each servicing trip of every bandwidth group:

increasing said polling run weight by said polling weight; and, polling consecutive logical ports of said bandwidth group and decrementing said polling run weight for each poll of a logical port that is associated with said bandwidth group.

3. The method of claim 2 further comprising ceasing said polling of consecutive logical ports of said bandwidth group because said polling run weight has dropped below a value to a remainder value.

4. The method of claim 3 further comprising, for a subsequent servicing trip of every bandwidth group, increasing said polling run weight by said remainder value and said polling weight.

5. A computer readable storage medium having stored thereon a sequence of instructions which, when executed by a computer, cause the computer to perform a method, said method comprising:

creating a plurality of bandwidth groups, each of the plurality of bandwidth groups including a plurality of logical ports to be polled;

computing a total bandwidth for each of the bandwidth groups;

computing a group share for each of the bandwidth groups;

computing a group ratio for each of the bandwidth groups;

setting a normalization factor based upon a minimum group ratio selected from amongst a plurality of group ratios calculated for each of the bandwidth groups, each of the plurality of group ratios being a count of logical ports in a bandwidth group divided by the group share for the bandwidth group;

multiplying the normalization factor by the group ratio for each of the bandwidth groups to calculate a polling weight for each of the bandwidth groups;

polling the plurality of logical ports in a plurality of trips; and, servicing each bandwidth group in succession on each trip to authorize logical ports from the bandwidth group to transfer data, the number of logical ports authorized on each trip being one of the polling weight for the bandwidth group and the polling weight for the bandwidth group plus one.

6. The computer readable storage medium of claim 5 wherein said method further comprises maintaining a polling run weight for said bandwidth group by:

for each servicing trip of every bandwidth group:

increasing said polling run weight by said polling weight; and, polling consecutive logical ports of said bandwidth group and decrementing said polling run weight for each poll of a logical port that is associated with said bandwidth group.

7. The computer readable storage medium of claim 6 wherein said method further comprises ceasing said polling of consecutive logical ports of said bandwidth group because said polling run weight has dropped below a value to a remainder value.

8. The computer readable storage medium of claim 7 wherein said method further comprises, for a subsequent servicing trip of every bandwidth group, increasing said polling run weight by said remainder value and said polling weight.

9. A networking system, comprising:

a) a switching fabric;

b) a plurality of bandwidth groups, each of the plurality of bandwidth groups including a plurality of logical ports;

c) a polling unit to poll said plurality of logical ports, said polling unit to:

compute a total bandwidth for each of the bandwidth groups;

compute a group share for each of the bandwidth groups;

compute a group ratio for each of the bandwidth groups;

set a normalization factor based upon a minimum group ratio selected from amongst a plurality of group ratios calculated for each of the bandwidth groups, each of the plurality of group ratios being a count of logical ports in a bandwidth group divided by the group share for the bandwidth group;

multiply the normalization factor by the group ratio for each of the bandwidth groups to calculate a polling weight for each of the bandwidth groups;

poll the plurality of logical ports in a plurality of trips; and, service each bandwidth group in succession on each trip to authorize logical ports from the bandwidth group to transfer data, the number of logical ports authorized on each trip being one of the polling weight for the bandwidth group and the polling weight for the bandwidth group plus one.

10. The networking system of claim 9 where said polling unit is implemented with software.

11. The networking system of claim 10 wherein said polling unit further comprises a processing core.

12. The networking system of claim 9 wherein said polling unit is implemented with programmable circuitry.

13. The networking system of claim 12 wherein said programmable circuitry further comprises an FPGA.

14. The networking system of claim 9 wherein said polling unit is implemented with custom logic circuitry.

15. The networking system of claim 9 wherein said polling unit further comprises a memory to store logical port identifiers for each of the plurality of logical ports where logical port identifiers associated with the same bandwidth group are stored at adjacent address locations within the memory and a plurality of storage elements for each of said bandwidth groups.

16. The networking system of claim 15 wherein said plurality of storage elements further comprise, for each of said bandwidth groups:

1) a head pointer storage element that points to a region in said memory where its corresponding bandwidth group starts;

2) a tail pointer storage element that points to a region in said memory where said corresponding bandwidth group ends;

3) a polling weight parameter storage element that stores a polling weight for said corresponding bandwidth group.

17. The networking system of claim 16 wherein said plurality of storage elements further comprise:

4) a remainder parameter storage element that keeps track of a remainder value for each trip through said bandwidth groups;

5) a polling run weight parameter storage element whose contents define how many reads are to be made from said memory for said corresponding bandwidth group for each trip through said bandwidth groups;

6) a pointer storage element whose contents are used to continue servicing logical ports within said corresponding group in a round robin fashion across trips through said bandwidth groups.

18. The networking system of claim 9 wherein said logical ports are ingress logical ports.

19. The networking system of claim 9 wherein said logical ports are egress logical ports.

20. An apparatus, comprising:
means for creating a plurality of bandwidth groups, each of the plurality of bandwidth groups including a plurality of logical ports to be polled;
means for computing a total bandwidth for each of the bandwidth groups;
means for computing a group share for each of the bandwidth groups;
means for computing a group ratio for each of the bandwidth groups;
means for setting a normalization factor based upon a minimum group ratio selected from amongst a plurality of group ratios calculated for each of the bandwidth groups, each of the plurality of group ratios being a count of logical ports in a bandwidth group divided by the group share for the bandwidth group;
means for multiplying the normalization factor by the group ratio for each of the bandwidth groups to calculate a polling weight for each of the bandwidth groups;
polling the plurality of logical ports in a plurality of trips; and,
means for servicing each bandwidth group in succession on each trip to authorize logical ports from the bandwidth group to transfer data, the number of logical ports authorized on each trip being one of the polling weight for the bandwidth group and the polling weight for the bandwidth group plus one.

21. The apparatus of claim 20 further comprising means for maintaining a polling run weight for said bandwidth group including:
means for increasing said polling run weight by said polling weight for each servicing trip of every bandwidth group; and,
means for polling consecutive logical ports of said bandwidth group and decrementing said polling run weight for each poll of a logical port that is associated with said bandwidth group for each servicing trip of every bandwidth group.

22. The apparatus of claim 21 further comprising means for ceasing said polling of consecutive logical ports of said bandwidth group because said polling run weight has dropped below a value to a remainder value.

23. The apparatus of claim 22 further comprising means for increasing said polling run weight by said remainder value and said polling weight for a subsequent servicing trip of every bandwidth group.

24. The apparatus of claim 23 where the polling weight for a first bandwidth group from the plurality of bandwidth groups corresponds to all of the logical ports that are associated with the first bandwidth group and where the polling weight for each of the plurality of bandwidth groups other than the first bandwidth group corresponds to less than all of the logical ports that are associated with the bandwidth group.

* * * * *